3 Sheets--Sheet 1.
E. E. BEAN.
Wax-Thread Sewing-Machines.
No. 134,508. Patented Jan. 7, 1873.
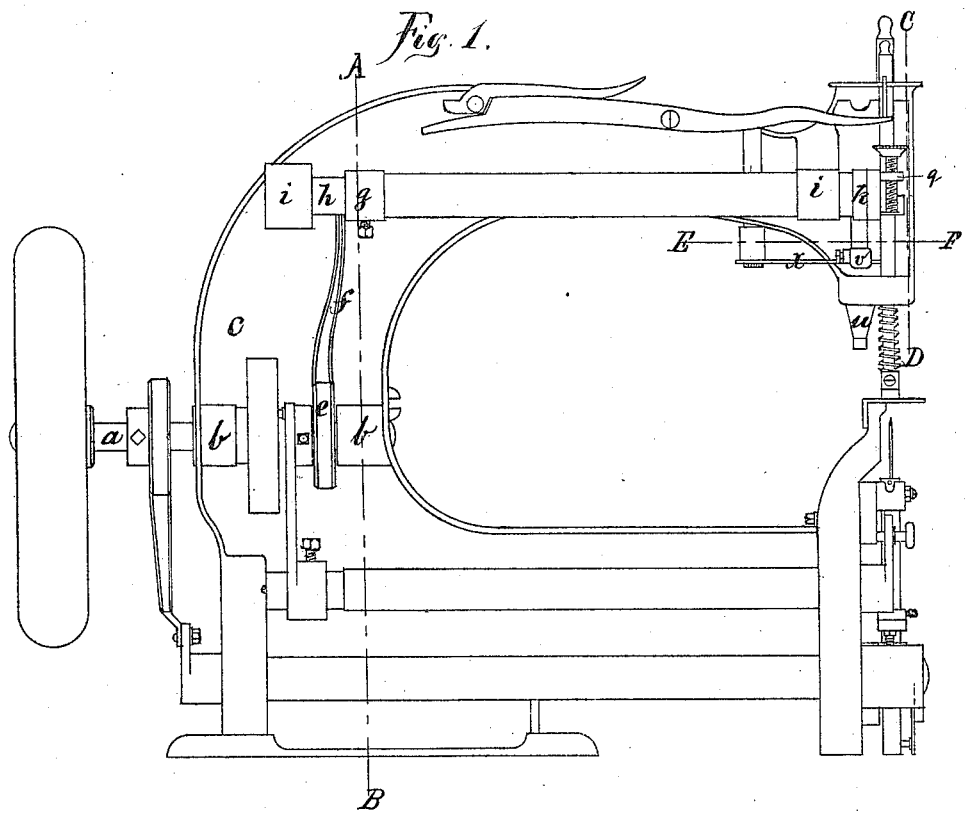
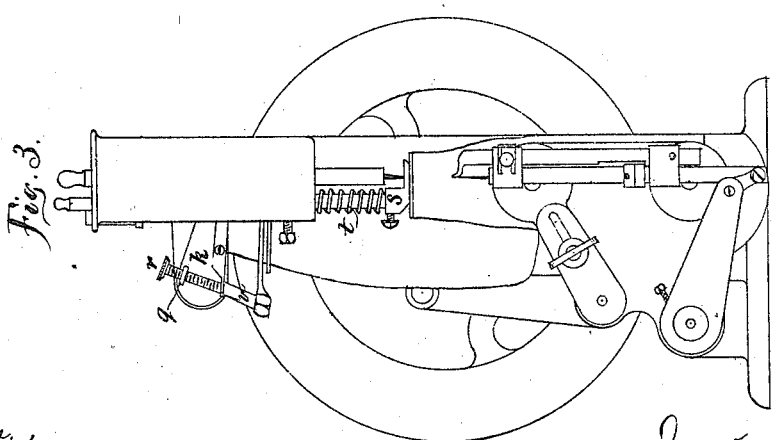
Witnesses:
George E. Phelps.
Helen S. Andren.
Inventor:
Edwin E. Bean
by Alban Andren, atty 3 Sheets--Sheet 2.

E. E. BEAN.
Wax-Thread Sewing-Machines.

No. 134,508. Patented Jan. 7, 1873.

Witnesses:
George E. Phelps.
Helen S. Andrén.

Inventor:
Edwin E. Bean
by Alan Andrén, atty

E. E. BEAN.
Wax-Thread Sewing-Machines.

No. 134,508.

Patented Jan. 7, 1873.

Witnesses:
George E. Phelps.
Helen S. Andrén.

Inventor:
Edwin E. Bean
by Alban Andrén, atty

UNITED STATES PATENT OFFICE.

EDWIN E. BEAN, OF BOSTON, MASSACHUSETTS.

IMPROVEMENT IN WAX-THREAD-SEWING MACHINES.

Specification forming part of Letters Patent No. 134,508, dated January 7, 1873.

*To all whom it may concern:*

Be it known that I, EDWIN E. BEAN, of Boston, in the county of Suffolk and State of Massachusetts, have invented certain new and useful Improvements in Wax-Thread-Sewing Machines; and I do hereby declare that the following is a full, clear, and exact description thereof, that will enable others skilled in the art to which it appertains to make and use the same, reference being had to the accompanying drawing and to the letters of reference marked thereon which form a part of this specification.

My invention relates to improvements on wax-thread-sewing machines, consisting in the employment of one single arm or crank for the operation of the awl-bar, thread-guide, and presser-foot, in a manner as will now be fully shown and described.

Figure 2:
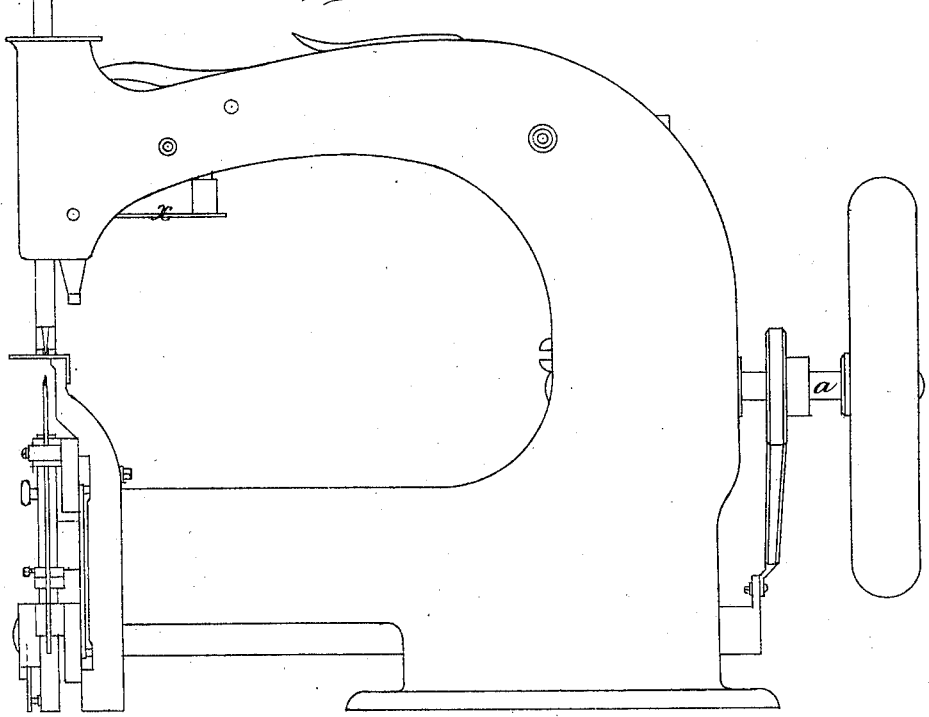
Figure 4:
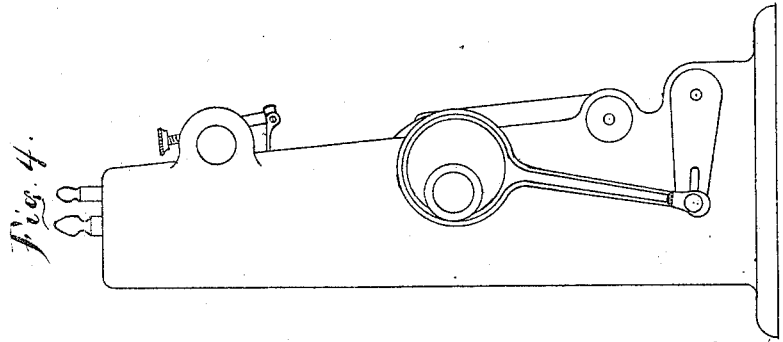
Figure 5:
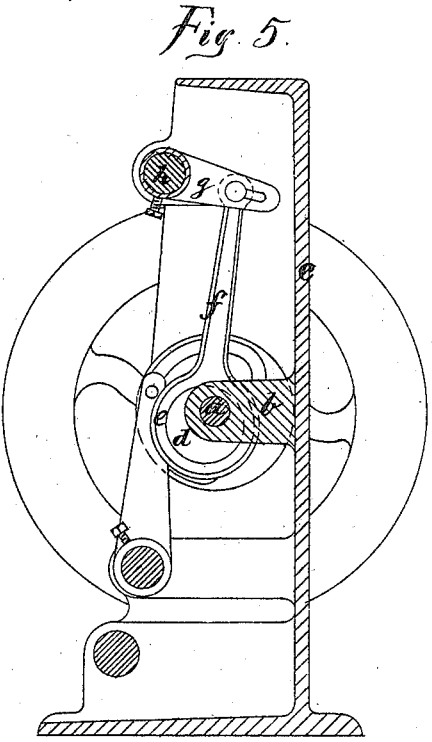
Figure 6:
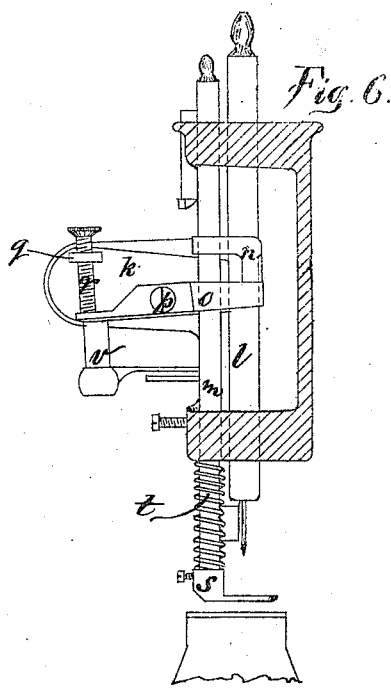
Figure 7:
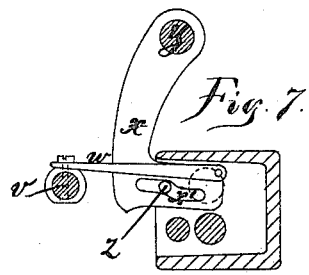

On the drawing, Figure 1 is a side elevation. Fig. 2 is also a side elevation seen from the opposite side of Fig. 1. Fig. 3 is a front view. Fig. 4 is a rear view. Fig. 5 is a cross-section on the line A B, Fig. 1. Fig. 6 is an enlarged cross-section on the line C D; and Fig. 7 is also an enlarged cross-section taken on the line E F, Fig. 1.

Similar letters refer to similar parts wherever they occur on the different parts of the drawing.

$a$ is the driving-shaft, movable in bearings $b\ b$ attached to the frame $c$. To the shaft $a$ is keyed or secured an eccentric disk, $d$, surrounded by the ring $e$ that forms a part of the connecting-rod $f$, as shown. The upper end of the connecting-rod $f$ is connected to an arm, $g$, secured to the rock-shaft $h$, movable in bearings $i\ i$ attached to the frame $c$. To the rock-shaft $h$ is attached an arm, $k$, the outer end of which is jointed directly to the awl-bar $l$, by which the said awl-bar is given a positive vertical throw up and down.

The presser-foot bar $m$ is also operated by the lever $k$ in the following manner: To the presser-foot bar $m$ is secured a projecting knee, $n$, that is lifted upward by means of the lever $o$, which is jointed to the arm $k$ by means of the pin or screw $p$, as shown in Fig. 6. On the side of the arm $k$ is attached a small bracket, $q$, tapped for the reception of a regulating-screw, $r$, the lower end of which rests on a projecting part of the lever $o$, and by the turning of which the lift of the presser-foot bar $m$ is easily regulated. The presser-foot $s$ is held in contact with the material operated upon by means of the coiled spring $t$, surrounding the presser-foot bar $m$ in the manner shown in Fig. 6.

The thread-guide bar $u$ is also operated from the arm $k$, as follows: From the under side of the said arm $k$ projects an arm, $v$, the lower end of which is jointed to a connecting-link, $w$, the extreme end of which is jointed to a knee-lever, $x$, made to move around the fulcrum or pin $y$ attached to the frame $c$, as shown in Figs. 1 and 7. On the upper end of the thread-guide bar $u$ is secured a crank-pin, $z$, that is guided in a groove, $x'$, made in the knee-lever $x$, as shown.

As the lever $k$ is rocked around its axis, so is also the arm $v$, that imparts the rocking motion to the link $w$ and lever $x$, whereby the crank-pin $z$ is operated by the curved groove $x'$, and by this means the thread-guide bar $u$ is made to swing partially around its axis, thus imparting the necessary motion to the thread-guide.

Having thus fully described the nature, construction, and operation of my invention, I wish to secure by Letters Patent, and claim—

1. In combination, the arm $k$, projection $n$, lever $o$, regulating-screw $r$, and presser-foot bar $m$, constructed and arranged as and for the purpose herein shown and described.

2. In combination, the arm $k$, projection $v$, link $w$, slotted knee-lever $x$, crank-pin $z$, and the thread-guide bar $u$, constructed and arranged as herein fully set forth and described.

EDWIN E. BEAN.

Witnesses:
WM. H. HUTCHINSON,
ALBAN ANDRÉN.